UNITED STATES PATENT OFFICE 2,196,746

PLASTICIZED CELLULOSE DERIVATIVE COMPOSITIONS

Joseph B. Dickey and James G. McNally, Rochester, N. Y., assignors to Eastman Kodak Company, Rochester, N. Y., a corporation of New Jersey No Drawing. Application December 16, 1938, Serial No. 246,203

6 Claims. (Cl. 106—40)

This invention relates to compositions of matter in which cellulose derivatives, such as cellulose acetate, cellulose nitrate or cellulose ethers, are combined or mixed with other substances, such as a compatible plasticizer, and a common solvent for both, with or without other useful addition agents, so that the resulting product will have properties such as will make the composition highly advantageous for use in the plastic and analogous arts, such for instance, as the manufacture of wrapping sheets, photographic film, artificial silk, varnishes or lacquers, and the like.

One object of this invention is to produce a composition of matter which may be made into permanently transparent, strong and flexible sheets or films of desired thinness which are substantially waterproof, are unaffected by ordinary photographic fluids and possess the desired properties of a support for sensitive photographic coatings. Another object of our invention is to produce a composition which is capable of easy and convenient manipulation in the plastic and analogous arts, such as in the manufacture of sheets, films, artificial silk filaments, varnishes, lacquers and the like, and to produce a composition which will not injure, or be injured by, the substances or surfaces with which it is associated during manufacture. Other objects will become apparent to those skilled in the art to which this invention pertains.

While cellulose acetates, nitrates and ethers have been known for decades it has also been known that to utilize them in the various plastic arts it is necessary to mix therewith such plasticizing or conditioning agents as camphor, castor oil, triphenyl phosphate, monochlornaphthalene or the like. Certain of these and other addition agents are also added for the purpose of reducing the inflammability of the product. Plastic inducing agents, such as the higher alcohols and their esters, are sometimes also added. Similarly, addition compounds of various kinds have been employed to increase flexibility, transparency, toughness, and other properties which will enhance the value of the resulting product. Addition products for the same or similar purposes are also added to cellulose acetates, nitrates and ethers to prepare them for use in the other plastic arts, such as in the manufacture of lacquers, varnishes, artificial silk filaments, moulded compounds and the like. While the plasticizers or other addition agents heretofore discovered have had their utility in the art, the increasing use to which cellulose derivatives have been put and the increasing number of desirable properties required of the cellulose derivative for most purposes has made the discovery of new and economical plasticizers or other addition agents a matter of considerable importance to the art.

We have discovered that valuable properties may be induced in and/or contributed to compositions containing cellulose derivatives such as cellulose acetate, by adding thereto as plasticizing compounds derivatives of furfuryloxy and tetrahydrofurfuryloxy acetic acids having the general formulas:

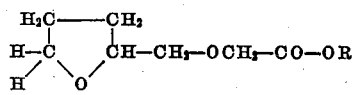

and

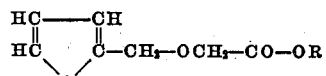

where R is an organic radical selected from the group consisting of the substituted and unsubstituted alkyl, cycloalkyl, aryl, heterocyclic and polyalkoxy groups. This class of compounds is compatible with cellulose derivatives and particularly compatible with cellulose acetate in the percentages hereinafter given.

These compounds may be prepared by treating furfuryloxy and tetrahydrofurfuryloxy acetic acids with the desired alcohol using a suitable catalyst such as hydrochloric, sulfuric, p-toluene sulfonic, sulfo-salicylic acids, etc. Water formed in the reaction may be removed by means of azeotropic distillation or by treating a suitable alcohol with the acid chlorides of the above named acids. Mixed esters may be prepared by a combination of any of the known methods.

These acids may be prepared by reacting a metal alcoholate of the alcohol with a halogenated fatty acid or by treating the alcohol with a Grignard reagent and reacting the product with a halogenated fatty acid, as set forth in our copending application, Serial No. 246,204, filed of even date herewith.

Examples of the preparation of the above mentioned derivatives are as follows:

Example 1

160 gm. of tetrahydrofurfuryloxyacetic acid are placed in a 1-liter flask with 600 cc. of butanol and 10 cc. of sulfuric acid and allowed to stand for several days. The mixture is then made neutral to litmus with sodium bicarbonate and distilled. The n-butyl ester boils at 110-115°/3 mm.

Example 2

160 gm. of tetrahydrofurfuryloxyacetic acid are placed in a 2-liter flask equipped with a column, condenser, separator and return tube from separator. Then 500 cc. of toluene, 200 gm. of methoxy ethanol, and 1 gm. of p-toluene sulfonic acid are added. The solution is then distilled to remove the water formed due to esterification. When the reaction is complete (5–6 hr.) the solution is neutralized with sodium bicarbonate and distilled. The β-methoxyethyl ester of tetrahydrofurfuryloxyacetic acid boils at 133–135°/3 mm.

Example 3

In a flask equipped as described above are placed 106 gm. of diethylene glycol, 1 gm. p-toluene sulfonic acid, 600 cc. xylene, and 320 gm. of tetrahydrofurfuryloxyacetic acid. Esterification is carried out as described above. The ditetrahydrofurfuryloxy acetate of diethylene glycol boils at 240–5/3 mm. There is also obtained some of the mono ester.

In the following examples and description we have set forth several of the preferred embodiments of our invention, but they are included merely for purposes of illustration and not as a limitation thereof.

Example 4

| | Parts |
|---|---|
| Cellulose acetate | 100 |
| Benzyl tetrahydrofurfuryloxyacetate | 70 |
| Acetone | 400 |

Example 5

| | Parts |
|---|---|
| Cellulose acetate | 100 |
| Ethylene glycol monoethyl ether tetrahydrofurfuryloxyacetate | 40 |
| Acetone | 300 |
| Methanol | 100 |

Example 6

| | Parts |
|---|---|
| Cellulose acetate | 100 |
| Diethylene glycol monoethyl ether tetrahydrofurfuryloxyacetate | 30 |
| Ethylene chloride | 300 |
| Dioxane | 100 |

Example 7

| | Parts |
|---|---|
| Cellulose acetate | 100 |
| Diethylene glycol ditetrahydrofurfuryloxyacetate | 20 |
| Triphenyl phosphate | 20 |
| Acetone | 300 |
| Ethyl acetate | 100 |

Example 8

| | Parts |
|---|---|
| Cellulose acetate propionate | 100 |
| Butyl phthalate | 20 |
| Diethylene glycol tetrahydrofurfuryloxyacetate butyrate | 30 |
| Propylene chloride | 200 |
| Ethyl lactate | 100 |
| Acetone | 100 |

Example 9

| | Parts |
|---|---|
| Cellulose nitrate | 100 |
| Glycerol tri-tetrahydrofurfuryloxyacetate | 30 |
| Ester gum | 40 |
| Ethyl acetate | 200 |
| Toluene | 100 |
| Ethanol | 100 |

Example 10

| | Parts |
|---|---|
| Cellulose butyrate | 100 |
| Cyclohexyltetrahydrofurfuryloxyacetate | 30 |
| Ethylene chloride | 300 |
| Acetone | 100 |

Example 11

| | Parts |
|---|---|
| Cellulose acetate butyrate | 100 |
| Triethylene glycol di-tetrahydrofurfuryloxyacetate | 20 |
| Triphenyl thiophosphate | 10 |
| Ethylene chloride | 400 |
| Methanol | 100 |

Example 12

| | Parts |
|---|---|
| Ethyl cellulose | 100 |
| Acetone | 400 |

$$CH_3CO\text{-}CH_2\text{-}\underset{O}{\underset{|}{CH}}\overset{CH_2\text{—}CH_2}{\underset{O}{\diagup}}CH\text{-}CH_2\text{-}OCH_2\text{-}CO\text{-}OC_2H_4\text{-}OC_2H_5$$

Composition of matter prepared as above described may be deposited upon any suitable film forming surface to form a film or sheet, as is well known to those skilled in the art. A film so produced has permanently brilliant transparency and low inflammability, burning no more readily than ordinary newsprint. Such film is exceedingly tough and flexible, as shown by the fact that it will withstand many folds upon a modified Schopped fold-tester (commonly used for such purposes) without breaking and that even after being subjected for a considerable number of days to air maintained at a temperature of 65° C. the film still maintains flexibility (in contrast to almost complete lack of flexibility where no plasticizer is used) demonstrating that the film will withstand ordinary usage satisfactorily for many years. The sum total of the above advantageous properties of a product produced from our new composition is considerably in excess of that of products produced with what have previously been regarded as the better plasticizers.

In order that those skilled in this art may better understand our invention we would state, by way of illustration, that for the manufacture of photographic film or other sheets our new composition of matter may be compounded as follows: 100 parts of acetone soluble cellulose acetate, i. e. cellulose acetate containing from 38% to 42% acetyl radical, approximately, is dissolved with stirring at atmospheric temperature in 300 to 500 parts, preferably 400 parts, by weight, of acetone. To this solution may be added from 5–50 parts by weight, of any one of the above plasticizers, it being found preferable to employ approximately 30 to 40 parts thereof. The amount of plasticizer may be decreased or increased, depending upon whether it is desired to decrease or increase, respectively the properties which this plasticizer contributes to the finished product. The amount of solvent employed may also be decreased or increased, depending upon whether it is desired to have a more or less freely flowing composition, respectively.

Other similar solvents than those mentioned above which are compatible with the cellulose acetate and our new plasticizers may also occur to those skilled in this art. In like manner our plasticizers may be compounded with other single or mixed organic esters of cellulose, such as cellulose aceto-stearate, aceto-malate, or cellulose nitro-acetate, or with the cellulose ethers, a suitable solvent which will dissolve both the cellulosic derivative and the plasticizer being employed.

Inasmuch as our above described composition of matter is quite useful in the production of films and sheets it will be apparent that our new plasticizers may also be employed with advantage in the other branches of the plastic art. For example, as set forth in our copending application filed of even date herewith, compositions of matter similar to those described herein may be employed in the manufacture of artificial silk by the dry spinning method. With a proper coagulating bath they may be employed for wet spinning. It may be desired to employ a composition of different viscosity or evaporation characteristics, but this is a mere matter of changing the solvent proportion or adding evaporation retardents or other high or intermediate boiling constituents, as has been well known in the art for more than a decade.

Our novel plasticizers may be employed also with advantage in connection with a number of the known lacquer and varnish formulas with which it may be found to be compatible. In such cases the plasticizer is usually first put into solution with the cellulose derivative solution and, if non-solvents are added, only to such an extent as will not precipitate the derivative from solution. Also the plasticizer is usually employed in larger amounts, such as from 50 to 60 parts, in compounding lacquers. Other uses within the scope of our invention will also suggest themselves to those skilled in the art and are to be included within the scope of the claims appended hereto.

What we claim is:

1. A composition of matter comprising a cellulose derivative and an organic ester of an acid selected from the group consisting of furfuryloxy and tetrahydrofurfuryloxyacetic acids.

2. A composition of matter comprising cellulose acetate and an organic ester of an acid selected from the group consisting of furfuryloxy and tetrahydrofurfuryloxyacetic acids.

3. A composition of matter comprising cellulose acetate and ethylene glycol monoethyl ether tetrahydrofurfuryloxyacetate.

4. A composition of matter comprising cellulose acetate and diethylene glycol monoethyl ether tetrahydrofurfuryloxyacetate.

5. A composition of matter comprising cellulose acetate and diethylene glycol ditetrahydrofurfuryloxyacetate.

6. A composition of matter comprising 100 parts of a cellulose derivative and 5–50 parts of an organic ester of an acid selected from the group consisting of furfuryloxy and tetrahydrofurfuryloxyacetic acids.

JOSEPH B. DICKEY.
JAMES G. McNALLY.